Patented May 19, 1942

2,283,335

UNITED STATES PATENT OFFICE 2,283,335

VULCANIZATION OF RUBBER

Arthur M. Neal, Wilmington, Del., and Bernard M. Sturgis, Pitman, N. J., assignors to E. I. du Pont de Nemours & Company, Wilmington, Del., a corporation of Delaware No Drawing. Application July 25, 1940, Serial No. 347,473

26 Claims. (Cl. 260—786)

This invention relates to the vulcanization of rubber and more particularly to new combinations of accelerators for the vulcanization of rubber.

It has been proposed to accelerate the vulcanization of rubber with a combination of accelerators of which one is designated the primary accelerator and the other is designated a secondary accelerator. The purpose of the secondary accelerator is generally to activate the primary accelerator. The use of secondary accelerators, as activators for acidic type primary accelerators such as the mercapto-thiazoles, has presented particularly difficult problems due to the tendency of such combinations to prevulcanize or "scorch" the rubber during processing operations. This is particularly true when it is attempted to use a dithiocarbamate as the secondary accelerator. In general, it has been found impossible to use a dithiocarbamate accelerator as a secondary accelerator with an acidic primary accelerator, such as the mercaptothiazoles and particularly 2-mercapto-benzothiazole, because of the great activity of such combinations of accelerators. Generally, such combinations of dithiocarbamates and mercapto-thiazoles render the rubber incapable of being processed due to its tendency to prevulcanize or scorch. Furthermore, combinations of dithiocarbamates with mercapto-thiazoles and other similar acidic accelerators have been found to impart inferior physical properties to the rubber. The resulting vulcanizates are generally poor in resistance to abrasion and in resistance to aging. Further, such combinations of accelerators usually cause bad reversion of the rubber at the longer cures, which is accompanied by a loss in tensile strength and a deterioration of the physical properties in general.

It is an object of the present invention to provide an improved method of vulcanizing rubber. Another object is to provide vulcanized rubber of improved properties. A further object is to improve the vulcanization of rubber by employing, as accelerators therein, new combinations of accelerators which are sufficiently safe at processing temperatures for commercial utilization and which are at the same time very active at normal vulcanization temperatures. A still further object is to provide a new combination of accelerators for the vulcanization of rubber which produces vulcanized rubber of improved properties. Other objects are to provide new compositions of matter and to advance the art. Still other objects will appear hereinafter.

The above and other objects may be accomplished in accordance with our invention, which comprises employing, as accelerators for the vulcanization of rubber, a 2-mercapto-thiazoline accelerator, as a primary accelerator, and a dithiocarbamate accelerator, as a secondary accelerator, the dithiocarbamate accelerator being an acyl derivative of a dithiocarbamic acid. We have found that, when such accelerators are employed together for accelerating the vulcanization of rubber, novel results are obtained, which are different than would be expected from the results which have been obtained when it has been attempted to employ dithiocarbamates with mercapto-thiazoles, such as 2-mercapto-benzothiazole, and similar acidic type accelerators. We have found that the 2-mercapto-thiazoline accelerators can be activated with dithiocarbamate accelerators so that stocks will be obtained, which can be processed even more safely than by the use of the 2-mercaptothiazoline alone and do not have the expected tendency to prevulcanize or scorch. Especially in the presence of carbon black, the acyl derivatives of dithiocarbamic acids show a marked retarding effect upon the rate of cure of 2-mercapto-thiazolines at processing temperatures. Upon vulcanizing at the usual vulcanizing temperatures they give a very fast cure, producing vulcanizates possessing exceptionally high moduli and tensile properties. In general, the curing curves are flat and the vulcanizates show very little or no reversion. Moreover, rubber, vulcanized by the joint employment of the accelerators of our invention, possesses remarkable resistance to deterioration. In particular, it is resistant to that deterioration normally caused by exposure to high temperatures. Vulcanized rubber compounds, prepared in accordance with our invention, also possess excellent resistance to abrasion, excellent resistance to flex-cracking and excellent resistance to tear, both at ordinary atmospheric temperatures and at high temperatures. The tensiles, determined at 100° C., are excellent.

The acyl derivatives of the dithiocarbamic acids of our invention may be represented by the formula:

wherein $X_1$ represents an acyl group, R represents hydrogen or an organic radical and $R_1$ represents an organic radical. While either or both of R and $R_1$ may represent aromatic radicals, preferably, at least one of R and $R_1$ represents an aliphatic and, particularly, an alkyl radical. We particularly prefer that R and $R_1$ each represents an aliphatic and, specifically, an alkyl radical. In some cases, it will be preferred that R and $R_1$ together represent a carbon chain having the terminal carbon atoms of the chain directly bonded to the nitrogen to form a heterocyclic ring, such as pentamethylene and hexamethylene. The acyl group, represented by $X_1$, may be derived from any organic acid but, preferably, will be a carbamyl group and, particularly, an aryl alkyl carbamyl group. The most desirable dithiocarbamic acid derivatives are those disclosed in Patent 2,171,421 to Ira Williams.

By the term "alkyl," as employed hereinafter and in the claims, we mean an aliphatic radical which consists of carbon and hydrogen and which contains no aromatic rings. By the term "aliphatic," we mean that the radical may contain aromatic, as well as non-hydrocarbon substituents. By the term "aryl," we mean that the radical consists of carbon and hydrogen and that the free valence belongs to a carbon in a benzene ring. By the term "aromatic," we mean that the free valence belongs to a carbon in a benzene ring and that the radical may contain non-hydrocarbon substituents. By an "accelerator" and an "accelerating" derivative, we mean that the designated compound is one which is operable alone to accelerate the vulcanization of rubber, i. e., in the absence of another organic accelerator. When we use expressions, such as "acyl derivative of a dithiocarbamic acid derived from a secondary amine" in the claims, it will be understood that, except where otherwise specifically indicated, the phrase beginning with "derived" refers to the dithiocarbamic acid and not to the acyl group. Also, by an "acyl derivative" of a dithiocarbamic acid, we mean one of the structure formed by the reaction of an acyl halide on an alkali metal salt of a dithiocarbamic acid wherein the acyl group replaces the alkali metal.

In order to more fully illustrate the remarkable properties that can be obtained when rubber is treated according to our invention, results of tests, in which combinations of acyl derivatives of dithiocarbamic acids with 2-mercapto-thiazolines have been used, are here described.

A particularly valuable class of activators for 2-mercapto-thiazolines consists of carbamyl derivatives of dithiocarbamic acids. The extreme safety of these combinations, at processing temperatures, together with the very desirable properties, obtainable at vulcanizing temperatures, is illustrated by tests made on the following stocks.

|  | Stock | | | | | | | |
|---|---|---|---|---|---|---|---|---|
|  | A | B | C | D | E | F | G | H |
| Smoked sheets | 100 | 100 | 100 | 100 | 100 | 100 | 100 | 100 |
| Zinc oxide | 5 | 5 | 5 | 5 | 5 | 5 | 5 | 5 |
| Stearic acid | 3 | 3 | 3 | 3 | 3 | 3 | 3 | 3 |
| Sulfur | 3 | 3 | 3 | 3 | 3 | 3 | 3 | 3 |
| 2-mercapto-thiazoline | 1 | 0.5 | 0.5 | 0.5 | 0.5 | 0.5 | 0.5 |  |
| 2-mercapto-benzothiazole |  |  |  |  |  |  |  | 0.5 |
| Phenyl ethyl carbamyl dibutyl dithiocarbamate |  | 0.25 |  |  |  |  |  |  |
| Phenyl methyl carbamyl dimethyl dithiocarbamate |  |  | 0.25 |  |  |  |  |  |
| Phenyl ethyl carbamyl dimethyl dithiocarbamate |  |  |  | 0.25 |  |  |  | 0.25 |
| Phenyl methyl carbamyl pentamethylene dithiocarbamate |  |  |  |  | 0.25 |  |  |  |
| Ethyl o-tolyl carbamyl pentamethylene dithiocarbamate |  |  |  |  |  | 0.25 |  |  |
| Ethyl alpha-naphthyl carbamyl dimethyl dithiocarbamate |  |  |  |  |  |  | 0.25 |  |

TABLE I

| Min. cured | Temp. cured | Stock A | Stock B | Stock C | Stock D | Stock E | Stock F | Stock G | Stock H |
|---|---|---|---|---|---|---|---|---|---|
| MODULUS AT 600% ELONGATION LBS./SQ. IN. | | | | | | | | | |
|  | °F. | | | | | | | | |
| 30 | 227 | No cure | No cure | No cure | No cure | No cure | 150 | No cure |  |
| 45 | 227 | 150 | No cure | No cure | No cure | No cure | 275 | 300 | No cure |
| 20 | 274 | 1,300 | 2,500 | 2,825 | 2,800 | 2,650 | 2,675 | 2,425 | 2,450 |
| 30 | 274 | 1,800 | 3,325 | 2,975 | 2,950 | 2,900 | 3,000 | 2,800 | (*) |
| 45 | 274 | 2,225 | 3,350 | 2,950 | 2,925 | 3,000 | 2,950 | 2,900 | (*) |
| 60 | 274 | 2,550 | 3,475 | 2,975 | 2,775 | 2,825 | 2,925 | 2,725 | (*) |
| TENSILE AT BREAK, LBS./SQ. IN. | | | | | | | | | |
| 30 | 227 | No cure | No cure | No cure | No cure | No cure | 300 | No cure |  |
| 45 | 227 | 500 | No cure | No cure | No cure | 975 | 650 | No cure |  |
| 20 | 274 | 3,200 | 4,425 | 4,800 | 4,775 | 4,975 | 4,625 | 4,400 | 2,450 |
| 30 | 274 | 4,125 | 4,400 | 4,500 | 4,475 | 4,350 | 4,475 | 4,550 | 575 |
| 45 | 274 | 4,325 | 3,650 | 4,050 | 4,300 | 4,225 | 3,875 | 4,350 | 225 |
| 60 | 274 | 4,025 | 3,600 | 3,975 | 4,075 | 4,025 | 3,725 | 4,250 | 425 |

* Broke short.

These tests show that carbamyl dithiocarbamates are powerful activators for 2-mercapto-thiazolines in a gum stock since the modulus, after 20 minutes cure at 274° F. of the activated stock, is approximately double that of the unactivated stock. The activated stocks however all possess great processing safety. The tests on stock H, in which 2-mercapto-benzo-thiazole was used as the primary accelerator, clearly show that this accelerator does not give a satisfactory cure when used in conjunction with a carbamyl dithiocarbamate. If the amount of carbamyl dithiocarbamate, used with 2-mercapto-benzo-thiazole, is sufficient to give any substantial amount of activation, the resulting rubber is so badly overcured as to be worthless.

In order to show that the results, obtained above, are not limited to the particular test formula used, the following stocks were prepared.

|  | Stock | | | |
| --- | --- | --- | --- | --- |
|  | I | J | K | L |
| Smoked sheets | 100 | 100 | 100 | 100 |
| Channel black | 25 | 25 | 25 | 25 |
| Zinc oxide | 5 | 5 | 5 | 5 |
| Stearic acid | 3 | 3 | 3 | 3 |
| Sulfur | 3 | 3 | 3 | 3 |
| 2-mercapto-thiazoline | 1 | 0.5 | 0.5 | 0.5 |
| Phenyl methyl carbamyl dimethyl dithiocarbamate |  | 0.25 |  |  |
| Phenyl ethyl carbamyl dimethyl dithiocarbamate |  |  | 0.25 |  |
| Phenyl methyl carbamyl dicyclohexyl dithiocarbamate |  |  |  | 0.25 |

The results of vulcanization tests, made on these stocks, are given in Table II.

TABLE II

| Min. cured | Temp. cured | Modulus at 500% elongation | | | | Tensile at break, lbs./sq. in. | | | |
| --- | --- | --- | --- | --- | --- | --- | --- | --- | --- |
|  |  | Stock I | Stock J | Stock K | Stock L | Stock I | Stock J | Stock K | Stock L |
|  | °F. |  |  |  |  |  |  |  |  |
| 30 | 227 | No cure | 75 | 100 | 150 | No cure | 225 | 300 | 400 |
| 60 | 227 | 700 | 150 | 150 | 150 | 1,700 | 550 | 500 | 625 |
| 20 | 274 | 1,575 | 2,625 | 2,325 | 2,075 | 3,700 | 5,050 | 4,650 | 4,975 |
| 30 | 274 | 2,025 | 3,075 | 2,800 | 2,700 | 4,725 | 5,050 | 4,850 | 5,250 |
| 45 | 274 | 2,450 | 3,300 | 2,950 | 2,925 | 5,275 | 4,750 | 4,400 | 4,750 |
| 60 | 274 | 2,700 | 3,300 | 2,900 | 3,125 | 4,900 | 4,600 | 4,450 | 4,650 |
| 90 | 274 | 3,000 | 3,325 | 3,150 | 3,125 | 4,975 | 4,600 | 4,700 | 4,625 |

These results show that, when a carbamyl dithiocarbamate is used as a secondary accelerator with 2-mercapto-thiazoline in a carbon black stock, a powerful activating effect is obtained at 274° F. The moduli of the stocks are greatly increased and the tensiles on the shorter cures are raised. The stocks also possess a flat curing curve and show no reversion of the modulus. It can be seen that this activation is not obtained at the expense of processing safety, as the activated stocks are, in every case, much safer at processing temperatures than the stock containing unactivated 2-mercapto-thiazoline. These activated stocks are ideal for the preparation of many types of rubber articles. A similar stock, in which 2-mercapto-benzo-thiazole rather than 2-mercapto-thiazoline was used as the primary accelerator with phenyl methyl carbamyl dimethyl dithiocarbamate, showed much lower moduli and tensiles than stock J. Furthermore, bad reversion was apparent, in the stock containing 2-mercapto-benzo-thiazole, as the modulus and tensile figures fell off badly. Such stock is entirely undesirable.

Not only are carbamyl dithiocarbamates desirable as activators for 2-mercapto-thiazoline itself, but also for carbon-substituted 2-mercapto-thiazolines and for metal salts of 2-mercapto-thiazolines. This is illustrated by the test results given in Table III, which also illustrates that smaller amounts of the activator may be used without impairing its effectiveness. These tests were made on the following stocks.

|  | Stocks | | | | | |
| --- | --- | --- | --- | --- | --- | --- |
|  | M | N | O | P | Q | R |
| Smoked sheets | 100 | 100 | 100 | 100 | 100 | 100 |
| Zinc oxide | 5 | 5 | 5 | 5 | 5 | 5 |
| Stearic acid | 3 | 3 | 3 | 3 | 3 | 3 |
| Sulfur | 3 | 3 | 3 | 3 | 3 | 3 |
| 2-mercapto-thiazoline | 0.5 | 0.5 |  |  |  |  |
| 2-mercapto-4-methyl-thiazoline |  |  | 0.5 | 0.5 |  |  |
| Zinc salt of 2-mercapto-thiazoline |  |  |  |  | 0.5 | 0.5 |
| Phenyl ethyl carbamyl pentamethylene dithiocarbamate |  | 0.15 |  | 0.15 |  | 0.15 |

TABLE III

| Min. cured | Temp. cured | Stock M | Stock N | Stock O | Stock P | Stock Q | Stock R |
| --- | --- | --- | --- | --- | --- | --- | --- |

MODULUS AT 600% ELONGATION, LBS./SQ. IN.

|  | °F. |  |  |  |  |  |  |
| --- | --- | --- | --- | --- | --- | --- | --- |
| 30 | 227 | 25 | No cure | 75 | 75 | 50 | 75 |
| 20 | 274 | 675 | 1,825 | 675 | 1,525 | 550 | 1,250 |
| 30 | 274 | 925 | 2,150 | 875 | 1,700 | 650 | 1,475 |
| 60 | 274 | 1,450 | 2,650 | 1,325 | 2,075 | 1,025 | 1,600 |

TENSILE AT BREAK, LBS./SQ. IN.

| 30 | 227 | 475 | No cure | 300 | 300 | 250 | 300 |
| --- | --- | --- | --- | --- | --- | --- | --- |
| 20 | 274 | 2,625 | 3,925 | 2,550 | 3,825 | 2,275 | 3,875 |
| 30 | 274 | 3,250 | 4,400 | 2,600 | 4,125 | 2,700 | 3,800 |
| 60 | 274 | 3,850 | 3,825 | 3,525 | 4,075 | 3,475 | 3,925 |

Other acyl derivatives of dithiocarbamic acids, which are valuable as activators for 2-mercapto-thiazolines, may be derived from organic carboxylic acids, such as benzoic, o-toluic, phthalic, cuminic, phenyl acetic, propionic, salicylic and the like. The desirability of these compounds is illustrated by tests, on two benzoyl derivatives of dithiocarbamic acids, made on the following stocks.

|  | Stock | | |
|---|---|---|---|
|  | S | T | U |
| Smoked sheets | 100 | 100 | 100 |
| Channel black | 25 | 25 | 25 |
| Zinc oxide | 5 | 5 | 5 |
| Stearic acid | 3 | 3 | 3 |
| Sulfur | 3 | 3 | 3 |
| 2-mercapto-thiazoline | 0.5 | 0.5 | 0.5 |
| Benzoyl dimethyl dithiocarbamate |  | 0.15 |  |
| Benzoyl pentamethylene dithiocarbamate |  |  | 0.15 |

Table IV gives the results of tests on these compounds.

TABLE IV

| Min. cured | Temp. cured | Modulus at 600% elongation | | | Tensile at break | | |
|---|---|---|---|---|---|---|---|
|  |  | Stock S | Stock T | Stock U | Stock S | Stock T | Stock U |
|  | °F. |  |  |  |  |  |  |
| 20 | 227 | No cure | No cure | No cure | No cure | No cure | No cure |
| 30 | 227 | 225 | 100 | 125 | 475 | 225 | 150 |
| 20 | 274 | 1,875 | 2,775 | 2,675 | 2,925 | 3,975 | 3,675 |
| 30 | 274 | 2,550 | 3,225 | 3,275 | 3,625 | 4,050 | 4,200 |
| 45 | 274 | 3,075 | 3,600 | 3,700 | 4,425 | 4,475 | 4,375 |
| 60 | 274 | 3,350 | 3,750 | 3,800 | 4,850 | 4,525 | 4,350 |
| 90 | 274 | 3,650 | 3,875 | 3,825 | 4,825 | 4,275 | 3,825 |

The combination, of these acyl dithiocarbamates with 2-mercapto-thiazolines, gives excellent cures at 274° F. coupled with good processing safety.

For many applications of rubber, such as its use for inner tubes for tires, resistance toward tearing is a very important factor. Vulcanizates, prepared according to our invention, have excellent tear resistance as shown in Table V. Tests were made on the following stock.

*Stock V*

| Smoked sheets | 100 |
|---|---|
| Channel black | 25 |
| Zinc oxide | 5 |
| Stearic acid | 3 |
| Sulfur | 3 |
| 2-Mercapto thiazoline | 0.5 |
| Phenyl ethyl carbamyl pentamethylene dithiocarbamate | 0.15 |

TABLE V

*Tear test at 28° C.*

| Min. cured at 274° F. | Stock S | Stock V |
|---|---|---|
| 20 | 9 | 38 |
| 30 | 16 | 49½ |
| 45 | 28 | 49 |
| 60 | 51 | 40½ |
| 90 | 47 | 41 |

This excellent tear resistance cannot be obtained by combinations of acyl derivatives of dithiocarbamic acids with mercapto-thiazoles, since an overcured condition generally results which causes a deterioration of physical properties.

The ability of rubber to stand up under high temperatures, while in service, is becoming increasingly more important. The rubber industry is therefore desirous of obtaining a rubber vulcanizate, having high modulus and tensile figures which will also be resistant to conditions of high temperature. The combinations of accelerators of this invention will provide these desired characteristics. This is illustrated by the test results given in Table VI.

TABLE VI

*Tensiles at break, lbs./sq. in.*

| Min. cured at 274° F. | Stock V tested at 28° C. | Stock V tested at 100° C. | Stock N tested at 28° C. | Stock N tested at 100° C. |
|---|---|---|---|---|
| 20 | 4,150 | 3,250 | 3,925 | 3,425 |
| 30 | 4,675 | 3,875 | 4,400 | 3,125 |
| 45 | 4,925 | 3,900 | 4,125 | 3,350 |
| 60 | 4,825 | 3,900 | 3,825 | 3,275 |
| 90 | 4,125 | 3,775 | 3,825 | 3,325 |

Rubber vulcanized by the use of dithiocarbamates, as accelerators, is notoriously poor in age and heat resistance. This poor resistance toward deterioration carries over into stocks in which dithiocarbamates are used as activators for mercapto-thiazoles and other similar types of accelerators. These combinations of accelerators are therefore valueless for the preparation of most commercial stocks. When a 2-mercapto-thiazoline, however, is used as the primary accelerator together with an acyl derivative of a dithiocarbamic acid, this deterioration in age and heat resistance is not apparent. Furthermore, vulcanizates, prepared according to our invention, possess very good resistance to abrasion, flex-cracking, and heat build-up.

Although certain definite combinations of accelerators have been shown, these combinations are illustrative rather than limiting. A great many 2-mercapto-thiazolines may be used as the primary accelerator with very good results. These include carbon substituted 2-mercapto-thiazolines in which one or both of the hydrogen atoms in the 4 or 5 or both the 4 and 5 positions of the ring are substituted by alkyl groups or hydroxy alkyl groups in the formula:

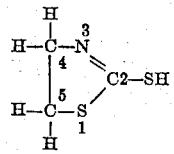

Examples of these are—

4-ethyl-2-mercapto-thiazoline
4-propyl-2-mercapto-thiazoline
4,4-dimethyl-2-mercapto-thiazoline
5,5-dimethyl-2-mercapto-thiazoline
4-methyl-4-ethyl-2-mercapto-thiazoline
4-methyl-5-propyl-2-mercapto-thiazoline
4,4-dimethyl-5-propyl-2-mercapto-thiazoline
4-isopropyl-5-propyl-2-mercapto-thiazoline
4-ethyl-5-propyl-2-mercapto-thiazoline
4-methyl-5-hydroxymethyl-2-mercapto-thiazoline
4-methyl-4-ethyl-5-propyl-2-mercapto-thiazoline
4-ethyl-5-methyl-2-mercapto-thiazoline
4-propyl-5-propyl-2-mercapto-thiazoline
4,5-dimethyl-2-mercapto-thiazoline
4-hydroxyethyl-2-mercapto-thiazoline
4,4,5,5-tetramethyl-2-mercapto-thiazoline Also, various metal salts of these 2-mercaptothiazolines may be used effectively. These include, among others.

Lead salt of 2-mercapto-thiazoline
Cadmium salt of 2-mercapto-thiazoline
Iron salt of 2-mercapto-thiazoline
Zinc salt of 4-methyl 2-mercapto-thiazoline
Cadmium salt of 4-methyl 2-mercapto-thiazoline
Zinc salt of 4-ethyl 2-mercapto-thiazoline
Lead salt of 5-propyl 2-mercapto-thiazoline
Cadmium salt of 4,4-dimethyl 2-mercapto-thiazoline
Iron salt of 5,5-dimethyl 2-mercapto-thiazoline
Zinc salt of 4-methyl-4-ethyl 2-mercapto-thiazoline
Cadmium salt of 4,4-dimethyl-5-propyl 2-mercapto-thiazoline
Zinc salt of 4-hydroxy methyl 2-mercapto-thiazoline
Zinc salt of 4,4,5,5-tetra-methyl 2-mercapto-thiazoline A large number of acyl derivatives of dithiocarbamic acids are desirable for use as secondary accelerators with the above 2-mercapto-thiazolines and their salts. Among these may be listed—

Phenyl methyl carbamyl diethyl dithiocarbamate
Phenyl methy carbamyl hexamethylene dithiocarbamate
Phenyl ethyl carbamyl diethyl dithiocarbamate
Phenyl ethyl carbamyl dipropyl dithiocarbamate
Phenyl ethyl carbamyl diamyl dithiocarbamate
Phenyl ethyl carbamyl di-isopropyl dithiocarcarbamate
Phenyl ethyl carbamyl methyl ethyl dithiocarbamate
Phenyl ethyl carbamyl hexamethylene dithiocarbamate
Phenyl ethyl carbamyl dicyclohexyl dithiocarbamate
Phenyl ethyl carbamyl cyclohexyl dithiocarbamate
Phenyl ethyl carbamyl tetrahydrofurfuryl dithiocarbamate
Ethyl o-tolyl carbamyl dimethyl dithiocarbamate
Ethyl alpha-naphthyl carbamyl pentamethylene dithiocarbamate
Diphenyl carbamyl dimethyl dithiocarbamate
Diphenyl carbamyl hexamethylene dithiocarbamate
Phenyl beta-naphthyl carbamyl pentamethylene dithiocarbamate
Diphenyl carbamyl phenyl ethyl dithiocarbamate
Dimethyl carbamyl dimethyl dithiocarbamate
Phenyl ethyl carbamyl phenyl ethyl dithiocarbamate
Furoyl dimethyl dithiocarbamate
Furoyl pentamethylene dithiocarbamate
Hexahydrobenzoyl hexamethylene dithiocarbamate
o-Toluyl dibutyl dithiocarbamate
alpha-Naphthoyl diethyl dithiocarbamate
beta-Naphthoyl diamyl dithiocarbamate
Cuminyl dibenzyl dithiocarbamate
p-Anisyl dicyclohexyl dithiocarbamate
Butyryl dimethyl dithiocarbamate
Succinyl methyl ethyl dithiocarbamate
Salicyl hexamethylene dithiocarbamate
Dimethyl carbamyl pentamethylene dithiocarbamate
Phthaloyl cyclohexyl dithiocarbamate The combinations of accelerators, employed in accordance with our invention, will generally comprise from about 1 to about 50 parts of the primary accelerator for each part of the secondary accelerator. It will generally be preferred to employ from about 1.5 parts to about 25 parts of the primary accelerator for each part of the acyl derivative of the dithiocarbamic acid.

Compounding ingredients and fillers, other than those shown in the test formulae and in other proportions, may also be used.

Our preferred class of compounds consists of the carbamyl derivatives of the dithiocarbamic acids, and our most preferred compounds are phenyl ethyl carbamyl dimethyl dithiocarbamate and phenyl ethyl carbamyl hexamethylene dithiocarbamate.

The combinations of accelerators herein described, namely, combinations of acyl derivatives of dithiocarbamic acids with 2-mercapto-thiazolines, are capable of producing highly desirable types of vulcanized ruuber. These combinations produce stocks having very high moduli and tensiles, a fast flat cure at ordinary curing temperatures, and freedom from reversion. These qualities are not obtained at the expense of processing safety, as the stocks have little tendency to prevulcanize or "scorch". The vulcanized rubber, prepared according to our invention, also has exceedingly good resistance toward tear, abrasion, flex-cracking and heat build-up. Another characteristic of great value is the resistance shown by these vulcanizates toward deterioration by heat or oxidation. On the whole, the combination of desirable properties, produced by the mixtures of accelerators of our invention, is one that is very difficult to duplicate with any other known accelerator or combination of accelerators.

We claim:
1. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating acyl derivative of a dithiocarbamic acid, wherein the acyl radical is attached through the sulfhydryl sulfur of the dithiocarbamic acid, as a secondary accelerator, there being from about 1 to about 50 parts of the primary accelerator to each part of the secondary accelerator.

2. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerting acyl derivative of a dithiocarbamic acid derived from a secondary amine, wherein the acyl radical is attached through the sulfhydryl sulfur of the dithiocarbamic acid, as a secondary accelerator, there being from about 1 to about 50 parts of the primary accelerator to each part of the secondary accelerator.

3. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating acyl derivative of a dithiocarbamic acid derived from a secondary amine in which at least one radical attached to the nitrogen is an aliphatic radical, wherein the acyl radical is attached through the sulfhydryl sulfur of the dithiocarbamic acid, as a secondary accelerator, there being from about 1 to about 50 parts of the primary accelerator to each part of the secondary accelerator.

4. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating acyl derivative of a dithiocarbamic acid derived from a secondary aliphatic amine, wherein the acyl radical is attached through the sulfhydryl sulfur of the dithiocarbamic acid, as a secondary accelerator, there being from about 1 to about 50 parts of the primary accelerator to each part of the secondary accelerator.

5. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating acyl derivative of a dialkyl dithiocarbamic acid, wherein the acyl radical is attached through the sulfhydryl sulfur of the dithiocarbamic acid, as a secondary accelerator, there being from about 1 to about 50 parts of the primary accelerator to each part of the secondary accelerator.

6. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating carbamyl dithiocarbamate, as a secondary accelerator, there being from about 1 to about 50 parts of the primary accelerator to each part of the secondary accelerator.

7. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating carbamyl dithiocarbamate, as a secondary accelerator, there being from about 1.5 to about 25 parts of the primary accelerator to each part of the secondary accelerator.

8. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating carbamyl dithiocarbamate derived from a secondary amine in which at least one radical attached to the nitrogen is an alkyl radical, as a secondary accelerator, there being from about 1.5 to about 25 parts of the primary accelerator to each part of the secondary accelerator.

9. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating carbamyl dialkyl dithiocarbamate, as a secondary accelerator, there being from about 1.5 to about 25 parts of the primary accelerator to each part of the secondary accelerator.

10. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating carbamyl dimethyl dithiocarbamate, as a secondary accelerator, there being from about 1.5 to about 25 parts of the primary accelerator to each part of the secondary accelerator.

11. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating carbamyl dithiocarbamate derived from a secondary amine in which two valences of the nitrogen are satisfied by the terminal carbon atoms of a single carbon chain, as a secondary accelerator, there being from about 1.5 to about 25 parts of the primary accelerator to each part of the secondary accelerator.

12. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating carbamyl hexamethylene dithiocarbamate, as a secondary accelerator, there being from about 1.5 to about 25 parts of the primary accelerator to each part of the secondary accelerator.

13. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating aromatic aliphatic carbamyl dithiocarbamate, as a secondary accelerator, there being from about 1 to about 50 parts of the primary accelerator to each part of the secondary accelerator.

14. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating arkyl carbamyl dithiocarbamate, as a secondary accelerator, there being from about 1.5 to about 25 parts of the primary accelerator to each part of the secondary accelerator.

15. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating aryl alkyl carbamyl dialkyl dithiocarbamate, as a secondary accelerator, there being from about 1.5 to about 25 parts of the primary accelerator to each part of the secondary accelerator.

16. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating phenyl ethyl carbamyl dithiocarbamate, as a secondary accelerator, there being from about 1.5 to about 25 parts of the primary accelerator to each part of the secondary accelerator.

17. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating phenyl ethyl carbamyl dialkyl dithiocarbamate, as a secondary accelerator, there being from about 1.5 to about 25 parts of the primary accelerator to each part of the secondary accelerator.

18. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and phenyl ethyl carbamyl dimethyl dithiocarbamate, as a secondary accelerator, there being from about 1.5 to about 25 parts of the primary accelerator to each part of the secondary accelerator.

19. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating aryl alkyl carbamyl dithiocarbamate derived from a secondary amine in which two valences of the nitrogen are satisfied by the terminal carbon atoms of a single carbon chain, as a secondary accelerator, there being from about 1.5 to about 25 parts of the primary accelerator to each part of the secondary accelerator.

20. Rubber having incorporated therein, prior to vulcanization, 2-mercapto-thiazoline, as a primary accelerator, and an accelerating acyl derivative of a dithiocarbamic acid, wherein the acyl radical is attached through the sulfhydryl sulfur of the dithiocarbamic acid, as a secondary accelerator, there being from about 1 to about 50 parts of the primary accelerator to each part of the secondary accelerator.

21. Rubber having incorporated therein, prior to vulcanization, 2-mercapto-thiazoline, as a primary accelerator, and an accelerating acyl derivative of a dithiocarbamic acid derived from a secondary aliphatic amine, wherein the acyl radical is attached through the sulfhydryl sulfur of the dithiocarbamic acid, as a secondary accelerator, there being from about 1 to about 50 parts of the primary accelerator to each part of the secondary accelerator.

22. Rubber having incorporated therein, prior to vulcanization, 2-mercapto-thiazoline, as a primary accelerator, and an accelerating acyl derivative of a dialkyl dithiocarbamic acid, wherein the acyl radical is attached through the sulfhydryl sulfur of the dithiocarbamic acid, as a secondary accelerator, there being from about 1 to about 50 parts of the primary accelerator to each part of the secondary accelerator.

23. Rubber having incorporated therein, prior to vulcanization, 2-mercapto-thiazoline, as a primary accelerator, and an accelerating carbamyl dialkyl dithiocarbamate, as a secondary accelerator, there being from about 1.5 to about 25 parts of the primary accelerator to each part of the secondary accelerator.

24. Rubber having incorporated therein, prior to vulcanization, 2-mercapto-thiazoline, as a primary accelerator, and an accelerating aryl alkyl carbamyl dithiocarbamate, as a secondary accelerator, there being from about 1.5 to about 25 parts of the primary accelerator to each part of the secondary accelerator.

25. Rubber having incorporated therein, prior to vulcanization, 2-mercapto-thiazoline, as a primary accelerator, and phenyl ethyl carbamyl dimethyl dithiocarbamate, as a secondary accelerator, there being from about 1.5 to about 25 parts of the primary accelerator to each part of the secondary accelerator.

26. Rubber having incorporated therein, prior to vulcanization, 2-mercapto-thiazoline, as a primary accelerator, and benzoyl dimethyl dithiocarbamate, as a secondary accelerator, there being about 1.5 to about 25 parts of the primary accelerator to each part of the secondary accelerator.

ARTHUR M. NEAL.
BERNARD M. STURGIS.